Ralph H. Menning
Robert T. Manley
James R. Pratt
INVENTORS.

INVENTORS.
Ralph H. Menning
Robert T. Manley
James R. Pratt
BY
ATTORNEY.

March 16, 1954 R. H. MENNING ET AL 2,672,267
MACHINE FOR VENDING THE CONTENTS OF BOTTLED GOODS
Filed July 16, 1951 7 Sheets-Sheet 3

INVENTORS
Ralph H. Menning
Robert T. Manley
James R. Pratt
BY
ATTORNEY.

Ralph H. Menning
Robert T. Manley
James R. Pratt
INVENTORS.

ATTORNEY.

March 16, 1954   R. H. MENNING ET AL   2,672,267
MACHINE FOR VENDING THE CONTENTS OF BOTTLED GOODS
Filed July 16, 1951   7 Sheets-Sheet 5

INVENTORS.
Ralph H. Menning
Robert T. Manley
James R. Pratt
BY
ATTORNEY.

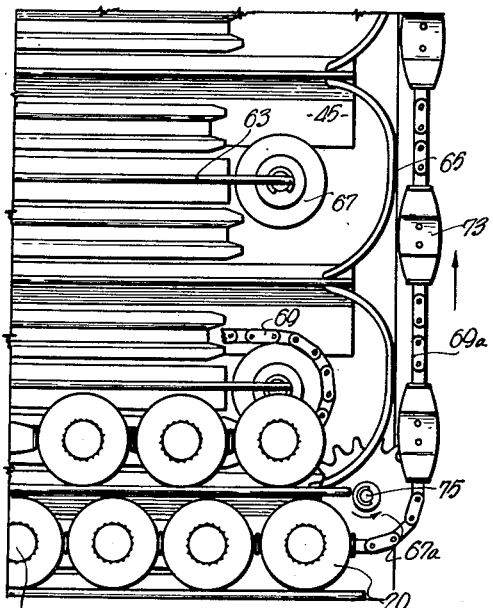
Fig. 13.
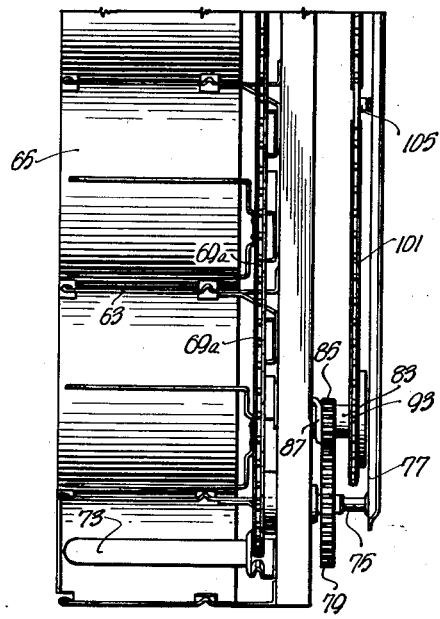
Fig. 14.
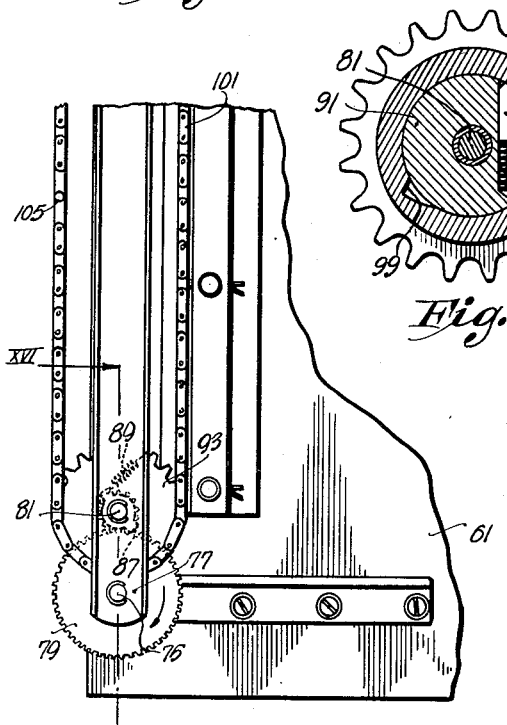
Fig. 17.
Fig. 15.
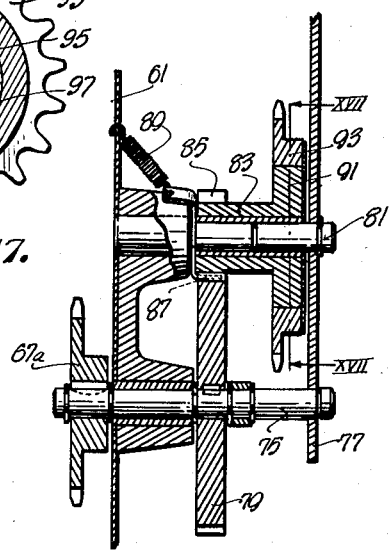
Fig. 16.
INVENTORS.
Ralph H. Menning
Robert T. Manley
James R. Pratt
BY
ATTORNEY.

Patented Mar. 16, 1954

2,672,267

UNITED STATES PATENT OFFICE 2,672,267

MACHINE FOR VENDING THE CONTENTS OF BOTTLED GOODS

Ralph H. Menning, Kansas City, Mo., Robert T. Manley, Kansas City, Kans., and James R. Pratt, Independence, Mo., assignors to The Vendo Company, Kansas City, Mo., a corporation of Missouri Application July 16, 1951, Serial No. 236,915

7 Claims. (Cl. 226—46.5)

This invention relates to automatic vending machines of the kind adapted, upon insertion of coins, to dispense liquids such as beverages or other substances by removing caps from bottles containing the same and pouring the contents into a cup or other container.

The most important object of this invention is to provide in a vending machine as above identified, structures so interconnected and mutually dependent as to require but a single primary, one-way prime mover for advancing the bottles, transferring the same to a carrier, moving the bottle to a point of storage, and decapping and pouring of its contents during such movement.

It is an important object hereof to provide improved multiple bottle conveyor structure, hopper means and elevating mechanism, all interconnected to cause operation of such structure as well as the hopper means by the elevating mechanism through a single prime mover for the latter, to the end that, during each cycle of operation, bottles are transferred from one conveyor to another, from the conveyor structure to the hopper and from the hopper to the elevating mechanism, that in turn decaps and pours the bottle carried thereby and returns the same to the conveyor structure.

Another important object hereof is to provide a control system that prevents operation except when a cup for receiving the drink is in a position ready for vending, a bottle is in the hopper ready for transfer to a cradle, and an access door to the vending station is closed.

Another object is to provide as a part of the control, means for preventing operation until a cup has been dispensed and is ready to receive the contents of a bottle to be poured.

A further object of this invention is to combine in a single machine all of the necessary parts for operation as initially described herein in such manner as to render each dependent in its operation on the other, whereby to reduce the cost of manufacture, lessen the possibility of failure, render the machine virtually tamper-proof, and eliminate to a large extent, the complicated, cumbersome and quickly worn, easily damaged mechanism that usually forms a part of apparatus of this character.

Fig. 13 is a fragmentary, elevational view similar to Figs. 1 and 8 showing the lower conveyor unit.

Fig. 14 is an elevational view similar to Fig. 9 but showing the lower conveyor unit.

Fig. 15 is a rear elevational view similar to Fig. 11, but illustrating the lower conveyor unit.

Fig. 16 is an enlarged, fragmentary, cross-sectional view taken on line XVI—XVI of Fig. 15 looking in the direction of the arrows.

Fig. 17 is a cross-sectional view taken on line XVII—XVII of Fig. 16; and

Fig. 18 is a schematic wiring diagram illustrating the electrical components of the vending machine.

The vending machine about to be described, includes in its broad aspects the provision of a storage cabinet for a relatively large number of capped bottles filled with liquid, together with automatic mechanism for decapping one of the bottles and emptying the contents thereof into a container, all upon insertion of a suitable medium such as a coin or the like.

Reference may be had to certain U. S. Letters Patent owned by the assignee hereof, for a better understanding of such broad principles of operation and function. The preliminary step to the objects attained by this invention is disclosed in Blossom et al, No. 1,902,612, of March 21, 1933. Reference may also be had to Olsen, No. 2,331,188, of November 2, 1943; Denison, No. 2,388,125, of October 30, 1945; and Hansen, No. 2,438,050, dated March 16, 1948.

Figure 1:
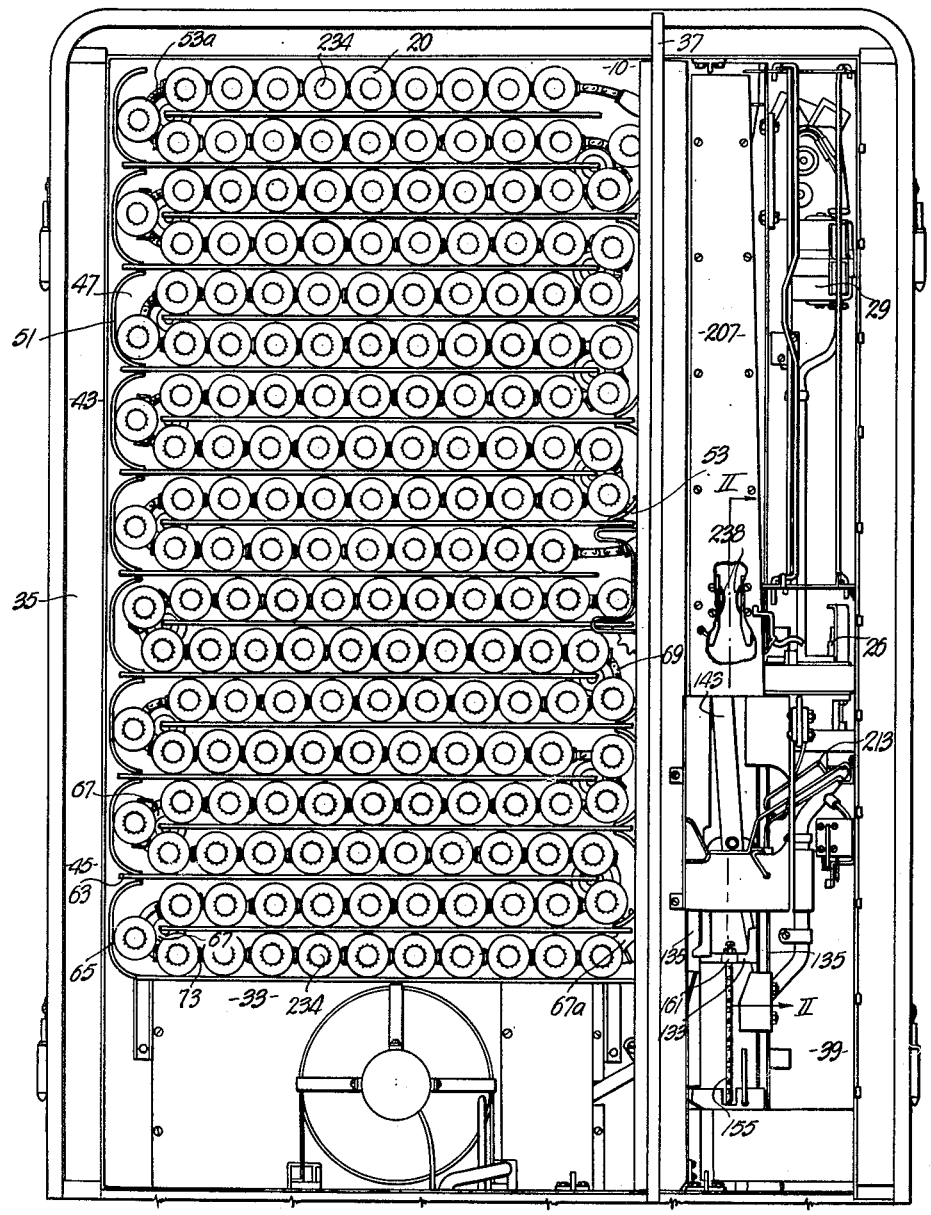
Figure 1 is a fragmentary, front elevational view of a machine for vending the contents of bottled goods made according to the present invention, with the doors of the cabinet entirely removed.

One of the primary features provided for in the present assembly and not disclosed by any of the aforesaid prior disclosures, comprises the provision of a novel bottle conveyor system, all mounted within a compartment 33 forming a part of a cabinet 35 that is shown in Fig. 1 of the drawings with its doors removed.

Compartment 33 is disposed on one side of a vertical partition 37 (Fig. 3) which also sets off another compartment 39 on the opposite side of partition 37 that in turn houses the mechanism shown in Figs. 2, and 4 to 6 inclusive hereinafter more fully described. There is provided a door as above indicated for each compartment 33—39 respectively, the door for the latter being illustrated in Fig. 2 only and broadly designated by the numeral 41.

The bottle conveyor system is housed entirely within the compartment 33 and includes an upper conveyor 43 and a lower conveyor 45. In addition to the illustration of these two conveyors in Fig. 1, the upper conveyor 43 is shown by Figs. 8 to 12 inclusive and the lower conveyor 45 is illustrated in Figs. 13 to 17 inclusive.

Conveyor 43 is provided with a rearmost, vertical panel 47 serving as a means for mounting the same within the cabinet 35. The normally front face of the panel 47 carries a plurality of spaced-apart, elongated shelves or guides 49 that are horizontal and in superimposed relationship. Alternate shelves are interconnected at each end thereof by arcuate strips 51 in such manner as to present a tortuous path of travel for bottles 20, carried by the shelves 49 in the manner illustrated by Figs. 1 and 8.

Figure 8:
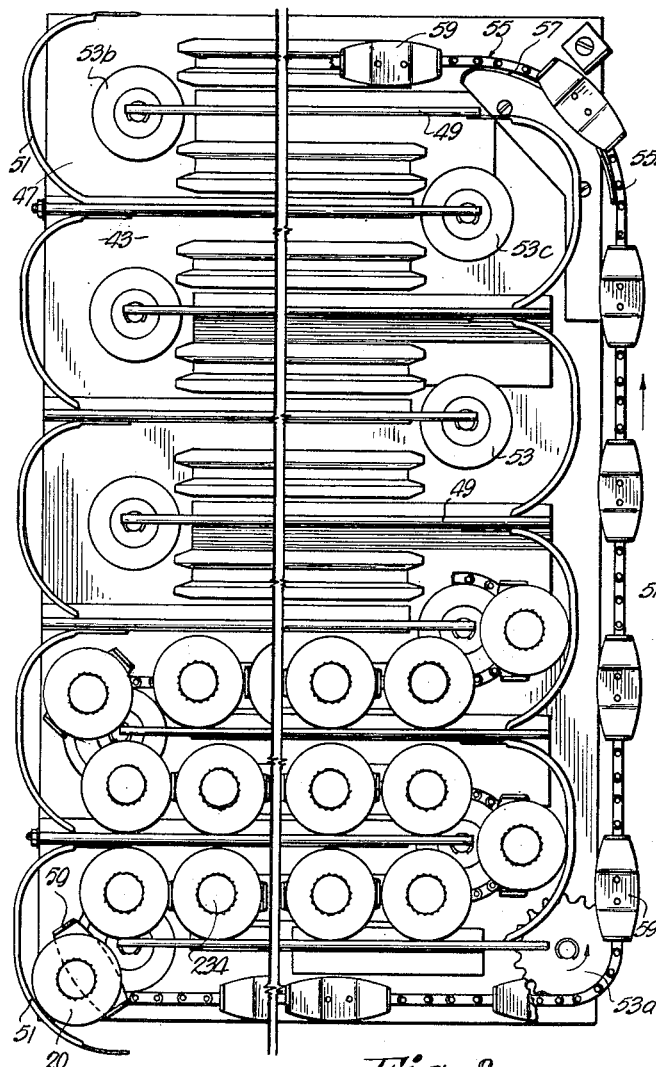
Fig. 8 is a condensed, front elevational view taken on an enlarged scale illustrating the upper conveyor unit shown in Fig. 1.
Figure 9:
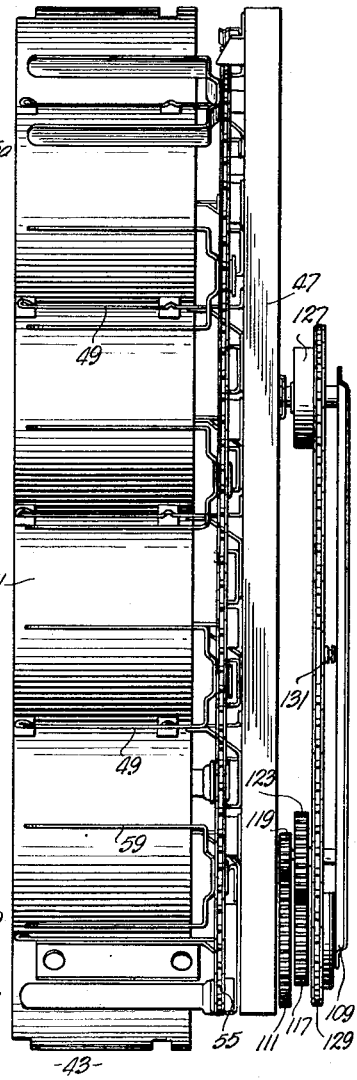
Fig. 9 is an elevational view of the upper conveyor unit showing that edge thereof next adjacent the partition illustrated in Fig. 3.
Figure 10:
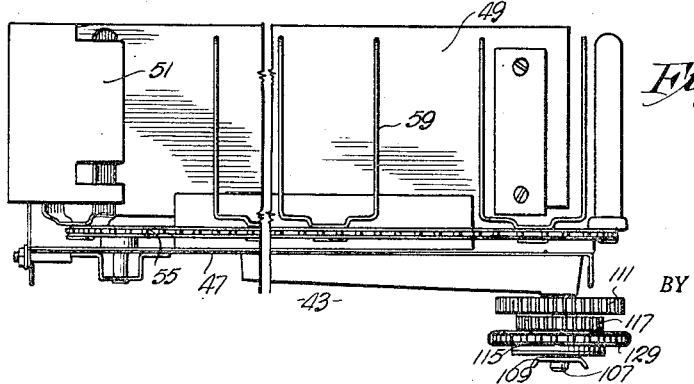
Fig. 10 is an inverted, plan view of the unit shown in Figs. 8 and 9.
Figure 11:
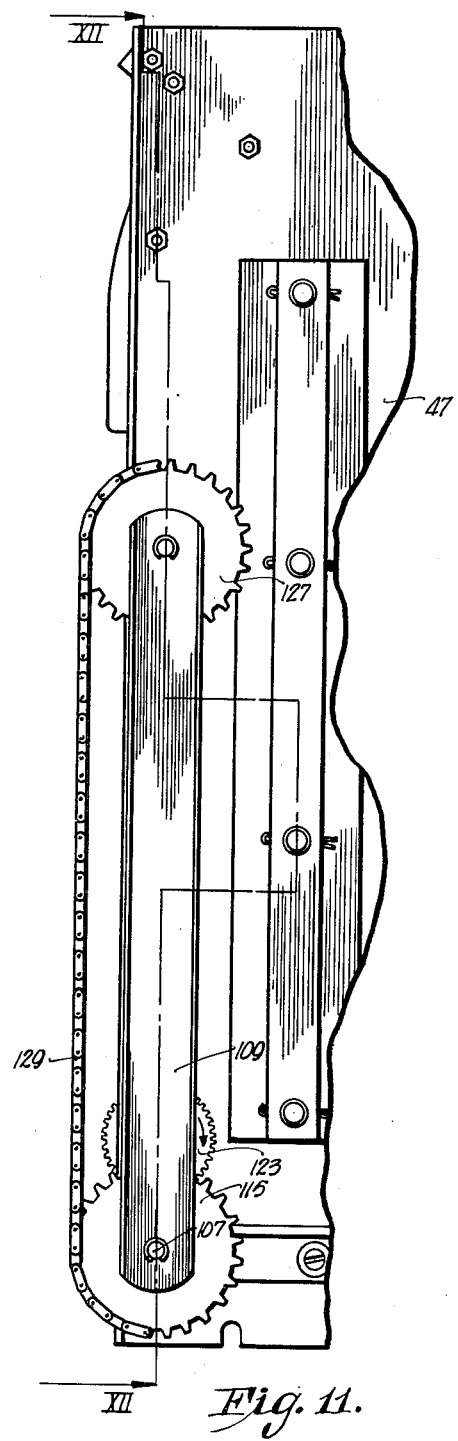
Fig. 11 is an enlarged, fragmentary, rear elevational view showing that part of the upper conveyor unit adjacent the partition of Fig. 3.

There is provided an idler sprocket 53 on the front face of panel 47 adjacent each arcuate strip 51 respectively at the left-hand side of the conveyor 43, and similarly adjacent each arcuate strip 51 along the right-hand side of conveyor 43 as shown in Fig. 8. Sprockets 53 are adapted to receive a continuous chain 55 having a vertical stretch 55a along the right-hand side of conveyor 43, viewing Fig. 8, and extending from the lowermost sprocket 53a upwardly over an arcuate guide 57. From guide 57, the chain 55 extends above the uppermost shelf 49 and passes over the uppermost sprocket 53b at that end of the uppermost shelf 49, opposite to guide 57. Chain 55 thereupon extends horizontally from sprocket wheel 53b between the upper two shelves 49 and passes over sprocket wheel 53c that is substantially aligned with the second shelf 49 and substantially directly below the guide 57.

It is obvious that this serpentine path of travel of the chain 55 continues downwardly throughout the height of upper conveyor 43 until the same passes over the lowermost sprocket 53a that is directly below the guide 57.

Figure 6:
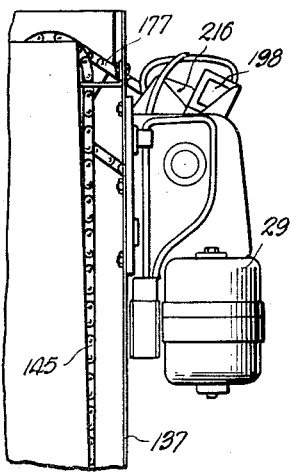
Fig. 6 is an enlarged, fragmentary, elevational view similar to Fig. 4 but including the drive motor shown by Fig. 5.

Continuous chain 55 is provided with a plurality of U-shaped brackets 59 for receiving bottles 20, each bracket 59 having the bight thereof secured directly to one or more of the links of chain 55 and the legs extending horizontally therefrom between pairs of shelves 49 in partial embracing relationship to the bottles 20 with the cap 234 facing outwardly as illustrated in Figs. 1 and 6. In other words, each bracket 59 is adapted to receive one bottle 20 with the latter resting for sliding movement on an underlying shelf 49 and with the brackets 59 relatively close together whereby to accommodate a relatively large number of bottles 20 on each shelf 49 respectively.

It is seen that when chain 55 is advanced in the direction of the arrow shown in Fig. 8 of the drawings, bottles 20 will be moved to the left on the uppermost shelf 49, to the right on the second shelf 49, and so on. Except during the time bottles 20 move around the ends of the shelves 49, they are wholly supported by shelves 49, and during the turn, arcuate strips 51 serve to hold the bottles 20 within their corresponding brackets 59.

So far as the construction thus far described is concerned, the lower conveyor 45 is substantially identical with upper conveyor 43. Thus, conveyor 45 has a supporting back panel 61, a plurality of superimposed, horizontal shelves 63, a number of arcuate end strips 65, a plurality of idler sprockets 67 rotatably mounted on back panel 61 and a continuous chain 69 trained over the sprocket wheels 67 and having a plurality of bottle-receiving brackets 73 secured thereto.

Conveyor chain 69 is likewise provided with a vertical stretch 69a along the right-hand side of conveyor 45 viewing Fig. 13, and chain 69 travels in the direction of the arrow shown in Fig. 13.

Conveyor unit 45 just described, is disposed directly below the unit 43 as shown in Fig. 1, to receive bottles 20 from the upper unit 43 and to carry the same to the lower right-hand corner of unit 45. These two units 43 and 45 are separately mounted and supported within the cabinet 35 and may be separately removed therefrom as desired. Accordingly, the weight of the bottles carried by unit 43 is not imparted to the conveyor 45 and likewise, the latter is separately supported for receiving only the weight of the bottles contained thereby.

As about to be described, the two chains 55 and 69 of units 43 and 45 respectively, are also separately driven to the end that each chain need only shift a portion of the total bottle capacity of the cabinet 35 during each step-by-step operation of the entire assembly.

The lowermost idler sprocket 67a for the lower conveyor unit 45 is mounted on a shaft 75 that is in turn supported by the panel 61 and by an auxiliary plate 77 spaced rearwardly from panel 61 as shown in Figs. 14 to 16 inclusive, and a gear 79 is keyed directly to the shaft 75 between panel 61 and plate 77. Another short shaft 81 directly above the shaft 75 and also carried by panel 61 and plate 77, has a sleeve 83 loosely mounted thereon, sleeve 83 being in turn provided with a small gear 85 constantly in mesh with the gear 79. A small ratchet 87 carried for oscillation by the shaft 81, is held biased against the teeth of gears 79 and 85 by means of a spring 89 that joins ratchet 87 with the panel 61, thus gear 85 is free to rotate in one direction to drive the gear 79 and consequently the sprocket 67a that is keyed to shaft 75, but ratchet 87 locks with such teeth of the gears 85 and 79 to prevent rotation in the opposite direction.

Sleeve 83 is provided with an annular outturned flange 91 that loosely receives a ring-like sprocket wheel 93 circumscribing its periphery. A reciprocable pin 95, carried by the flange 91, is biased outwardly against the sprocket wheel 93 by a spring 97 and a notch formed in the sprocket wheel 93 presents a shoulder 99 adapted for engagement by the pin 95, when sprocket wheel 93 is rotated in one direction, thereby preventing rotation of the gear 85 in the opposite direction. In this connection it is to be noted that when the sprocket wheel 93 is rotated in the opposite direction, ratchet 87 will operate to prevent rotation of gear 85 by virtue of the frictional contact between sprocket 93 and flange 91.

A continuous drive chain 101 trained over the sprocket wheel 93, also passes over an idler sprocket wheel (not shown) between the uppermost and lowermost ends of the lower conveyor unit 45 and between panel 61 and plate 77. Such idler sprocket and its disposition will be clarified after the description of the drive chain for the upper conveyor unit 43 about to be set forth.

Figure 12:
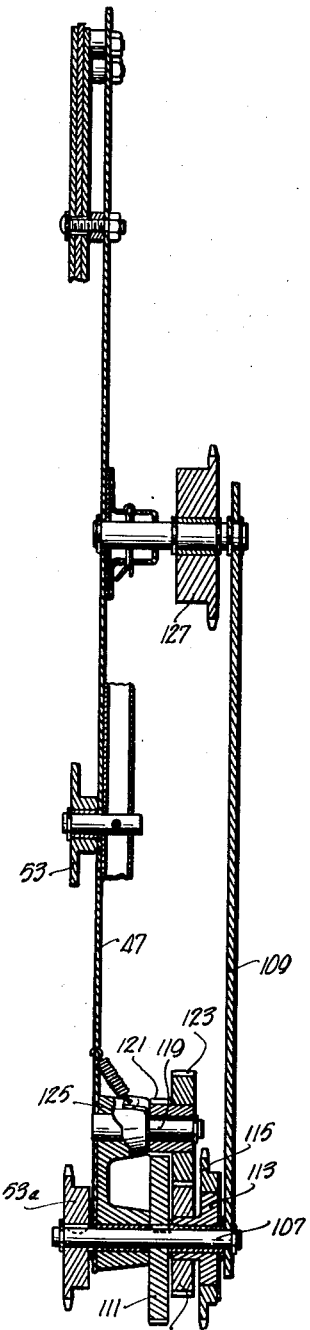
Fig. 12 is a cross-sectional view taken on line XII—XII of Fig. 11 looking in the direction of the arrows.
Figure 1B:
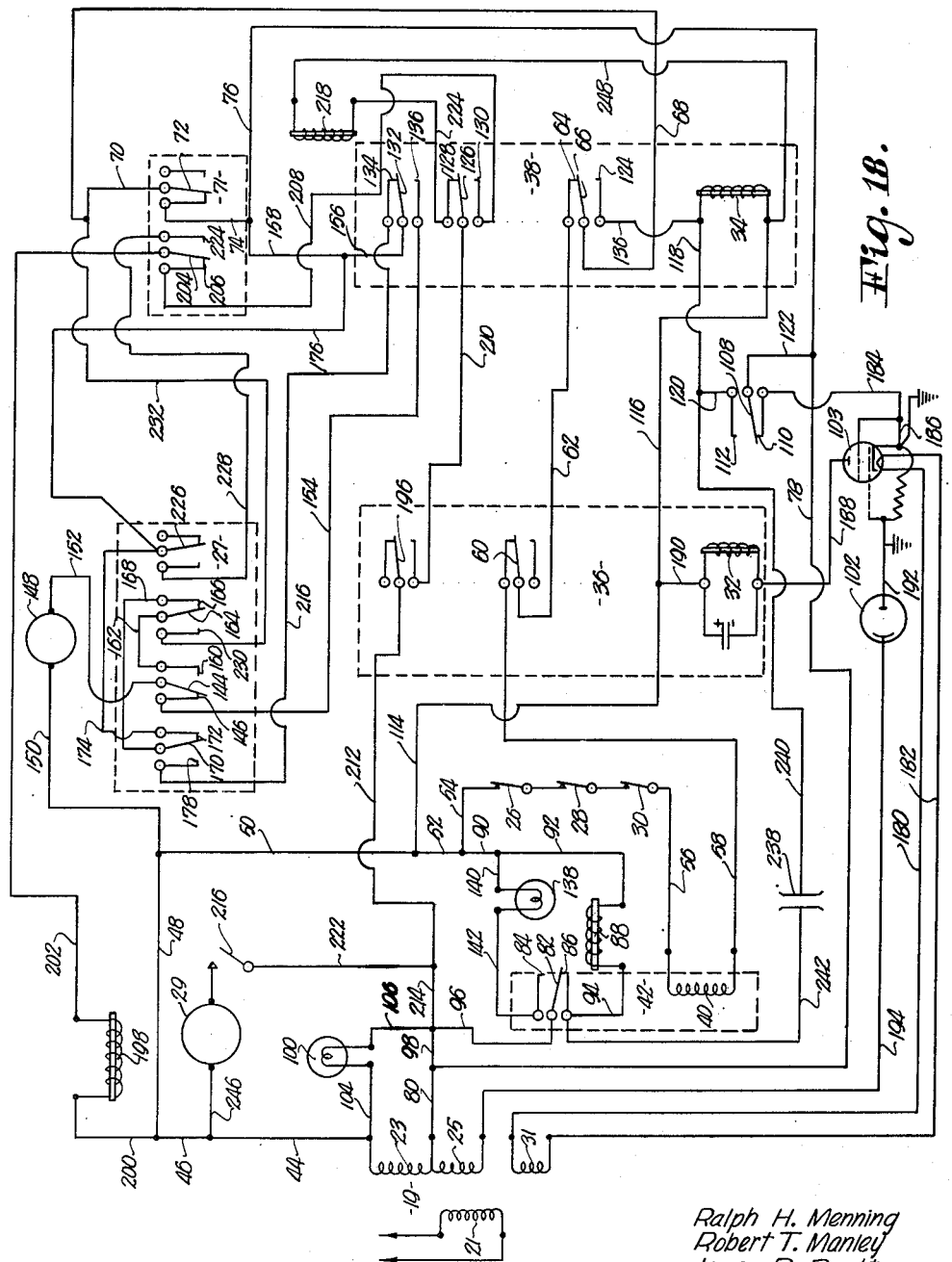

Drive chain 101 is provided with a laterally extending connecting pin 105 for purposes hereinafter described. The drive assembly for the upper conveyor 43 is substantially the same as that for the lower assembly 45 in that the lowermost sprocket 53a is secured to a shaft 107 corresponding to shaft 75 and supported by panel 47 and plate 109. Shaft 107 has a gear 111 thereon (Fig. 12) similar to gear 79 in Fig. 16, and the drive unit shown in Fig. 12 is likewise provided with a sleeve having an out-turned flange 113 with a sprocket wheel 115 circumscribing the same, such sleeve having a gear 117 thereon. A spring-loaded pin and shoulder such as at 95 and 99 respectively, in Fig. 16, is also provided for the flange 113 in sprocket wheel 115. Flange 113, gear 117 and sprocket 115 are loosely mounted for free rotation on shaft 107. A shaft 119 corresponding to shaft 81 loosely carries a pair of interconnected gears 121 and 123 in mesh with gears 111 and 117 respectively.

A spring-loaded ratchet 125 corresponds to ratchet 87 and operates to releasably lock the gears 111 and 121 against rotation. The sprocket wheel 115 is operably connected with an idler sprocket 127 intermediate the upper and lower extremities of unit 43 between panel 47 and plate 109 by a continuous drive chain 129. Chain 129 has a connecting pin 131 (Fig. 9) corresponding to the connecting pin 105 for chain 101 (Fig. 14).

Figure 2:
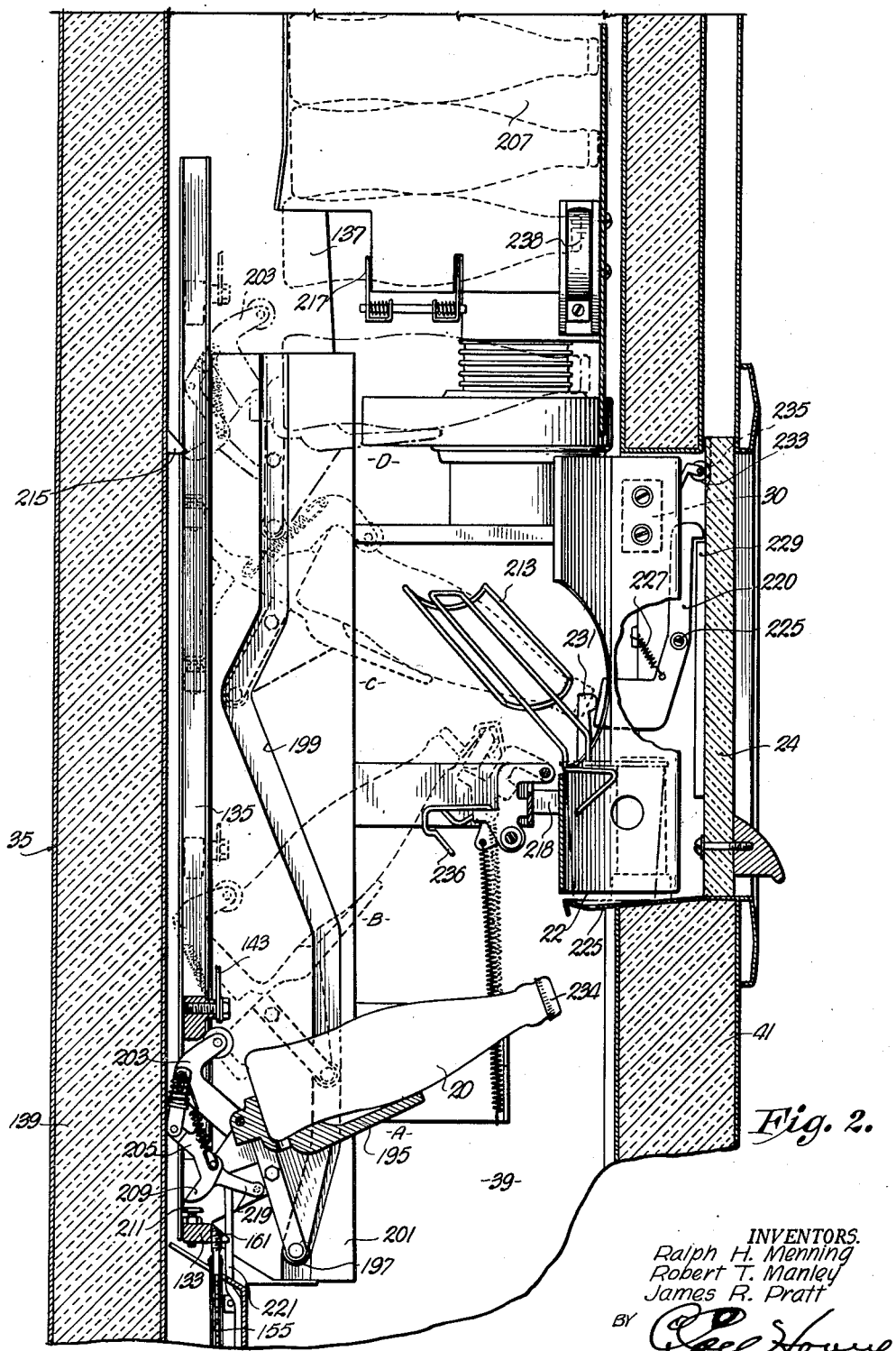
Fig. 2 is an enlarged, fragmentary, cross-sectional view taken on line II—II of Fig. 1 looking in the direction of the arrows.
Figure 4:
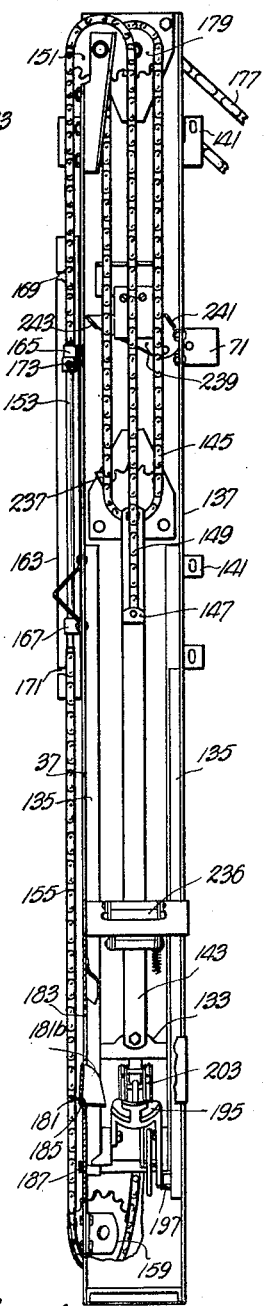
Fig. 4 is an elevational view similar to Fig. 1, parts being entirely removed and broken away to illustrate parts of the drive mechanism.

In Figs. 1, 2 and 4 of the drawings, there is illustrated a cradle-frame 133 mounted for vertical reciprocation along a rectilinear path of travel within a pair of opposed guide channels 135 in the compartment 39, one of the channels 135 being secured directly to the partition 37 and the other channel 135 being secured to an opposed vertical plate 137, preferably forming a part of the partition 37 and being releasably secured therewith to the back wall 139 of cabinet 35 by suitable brackets 141. An elongated bar 143 pivotally connected to frame 133 at the uppermost end of the latter, extends upwardly between partition 37 and plate 137 and pivotally connects at its uppermost end with a continuous chain 145, also disposed between partition 37 and plate 137. Bar 143 has a laterally extending bracket 147 spaced below its uppermost end for receiving one end of a chain 149, the latter passing upwardly from bar 143 and being trained over idler sprocket 151 above the uppermost end of the partition 37. Chain 149 extends downwardly from idler sprocket 151 and connects with the uppermost end of a vertical rod 153. A chain 155 joined at one end thereof with the lowermost end of rod 153 extends downwardly along the partition 37 within compartment 33 and passes through an opening 157 within partition 37 beneath an idler sprocket 159 and joins directly with cradle-frame 133 as at 161.

An elongated connector 163, within compartment 33 adjacent partition 37, is U-shaped in cross-section and has a pair of spaced-apart bearings 165 and 167 rigid to one leg thereof and slidable on the rod 153. Spaced-apart openings 169 and 171 formed in the other leg of the connector 163, are adapted to receive pin 131 on chain 129 (Fig. 9) and pin 105 on chain 101 (Fig. 14) respectively.

A collar 173 adjustably secured to the rod 153 is disposed between the bearings 165 and 167.

A common prime mover, such as an electric motor 29 (Figs. 1, 5 and 6) is provided to drive chain 145 and accordingly to reciprocate cradle-frame 133 through bar 143, chains 149 and 155 and rod 153, and also to advance conveyor units 43 and 45 through connector 163. Prime mover 29 is mounted on the plate 137 adjacent the uppermost end thereof and is operably connected with a sprocket wheel 175 by means of a continuous chain 177. Sprocket wheel 175 is connected with an opposed sprocket wheel 179 that receives the uppermost end of the chain 145.

In understanding the operation of the unit thus far described, it is to be noted that the motor 29 operates in only one direction and each time the same is energized to drive the chain 177 and accordingly the chain 145, the cradle-frame 133 and its component parts are raised and lowered within the guide tracks 135. As chain 145 advances, bar 143 is carried upwardly thereby, over sprocket wheel 179 and thence downwardly to the stand-by position shown in Fig. 4 of the drawings. Such movement of the bar 143 reciprocates the cradle-frame 133 within the tracks 135 by virtue of the pivotal connection between bar 143 and the upper end of frame 133. Simultaneously, the bracket 147 on chain 149 moves upwardly, as does the connection 161 between chain 155 and the frame 133 at the lower end of the latter. Such reciprocable movement of the chains 149 and 155 is imparted to the rod 153. As bracket 147 moves upwardly, collar 173 moves downwardly with rod 153 until the same comes into contact with the lowermost bearing 167 of connector 163. Thus, there is a period of "dwell" before the collar 173 operates to drive the lower conveyor 45 through connector 163. As collar 173 forces bearing 167 and accordingly, connector 163 downwardly, such downward action is imparted to chain 101 through pin 105 (Fig. 14). Sprocket wheel 93 is thereby driven in one direction and its shoulder 99 coming into contact with pin 95, drives out-turned flange 91, sleeve 83 and gear 85 in the same direction. Spring 89 yields, rendering ratchet 87 ineffective in preventing gear 85 from rotating gear 79 in the opposite direction. Such rotation of gear 79 rotates shaft 75 and accordingly, sprocket wheel 67a, in the direction of the arrow shown in Fig. 13. Conveyor chain 69 is thereby shifted in the direction of the arrow shown in Fig. 13 until rod 153 and accordingly collar 173 and connector 163 reach the lowermost end of their paths of travel as determined by the uppermost end of bar 143 passing over sprocket 179 and returning downwardly to the position illustrated by Fig. 4.

When the lower conveyor unit 45 is thus advanced, all of the bottles 20 carried thereby, are shifted one step and the lowermost bottle adjacent the sprocket wheel 67a (Fig. 13) is moved into a hopper 181 (Figs. 3 and 4) hereinafter more fully described. Such advancement of the lower conveyor unit 45 leaves an empty space or empty bracket 73 at the uppermost extremities of the lower unit 45, or at the uppermost end of vertical stretch 69a. Such downward travel of the connector 163 also moves the connector pin 131 of chain 129 (Fig. 9) downwardly, but such movement of chain 129 will not impart movement to the upper conveyor unit 43 not only because of the arrangement of the pin and shoulder means in sprocket 115 and flange 113 (Fig. 12) which as above described is similar to that shown in Fig. 17, but because of the operation of ratchet 125 locking the gears 121 and 111 against rotation.

With motor 29 running in the same direction, as soon as the uppermost end of bar 143 passes over sprocket wheel 179 and commences its downward travel, collar 173 will move upwardly away from the lower bearing 167 without imparting movement to the connector 163 and accordingly another "dwell" period will exist before the collar 173 contacts the upper bearing 165 and advances the upper conveyor 43. Upward movement of connector 163 moves pin 131 on chain 129 (Fig. 9) upwardly to rotate sprocket 115. By virtue of the pin-shoulder connection between sprocket 115 and flange 113 (Fig. 12) which is similar to that illustrated in Fig. 17, sprocket wheel 115 will rotate flange 113 and gear 117 therewith.

Gears 123 and 121 will be rotated in the opposite direction and gear 111 will rotate in the same direction as sprocket wheel 115 to rotate sprocket 53a therewith and thereby move conveyor chain 55 in the direction of the arrow shown in Fig. 8.

A bottle 20 carried by the bracket 59 next adjacent the sprocket wheel 53a will be deposited in the vacant bracket 73 of the lower conveyor 45 and an empty bracket 59 will be presented adjacent the guide 57. The fact that such upward movement of the connector 163 also drives the chain 101 through pin 105 has no effect upon the lower unit 45 because upward movement of pin 105 operates to drive the sprocket 93 in a direction to move its shoulder 99 away from the spring-loaded pin 95.

Bottles 20 emanating from the lower conveyor unit 45 are directed into inclined pivotally mounted L-shaped hopper 181 carried by the partition 37 adjacent opening 183 therethrough. Leg 181a of hopper 181 shown in Figs. 3 and 4 of the drawings in a vertical position, is normally horizontal and disposed within the compartment 33, while leg 181b of hopper 181 is normally substantially within the opening 183. Inclined pivotal axis 185 for the hopper 181 is disposed at the point of merger between the legs 181a and 181b. When leg 181a is in a horizontal position ready for receiving a bottle 20 from conveyor assembly 45 and such bottle is moved to the hopper 181, the weight of bottle 20 actuates an arm 28a for switch 28 that is carried by partition 37. An L-shaped crank 187 has one leg thereof pivotally secured to the partition 37 and its other leg extending through an arcuate slot 189 formed in the partition 37 and terminating within the compartment 39 in the path of travel of cradle-frame 133.

A spring 191 on partition 37 and connected with crank 187, holds the hopper 181 biased in the position with leg 181a thereof horizontally by virtue of a pivotal link connection 193 between hopper 181 and crank 187. It is seen that movement of the cradle-frame 133 to the lowermost end of its path of travel where the same strikes the crank 187, operates to swing the hopper 181 to the position illustrated in Figs. 3 and 4 against the action of spring 191 to dump a bottle 20 from the hopper 181 into the compartment 39. Such movement of the bottle 20 away from switch arm 28a, operates to open switch 28 from the normally closed position shown in Fig. 18.

Frame 133 is provided with a swingable bottle-receiving cradle 195 (Figs. 2 and 4) having its swinging movement relative to frame 133 controlled by a roller 197 thereon, riding in a cam groove 199 formed in an elongated bar 201. Clamping means 203 on the cradle 195 is movable to and from a position engaging the bottle 20 and holding the same on the cradle 195, such clamping means 203 being in the fully open position when the frame 133 and the cradle 195 are at the lowermost ends of their paths of travel. Spring-loaded actuating linkage 205 for the clamping means 203, joins the latter with the frame 133.

Frame 133 and cradle 195 are shown in four positions in Fig. 2 of the drawings, designated "A," "B," "C" and "D" respectively.

In position "A," clamp 203 is completely released and bottle 20 has just been moved from hopper 181 to cradle 195. In position "B," cap 234 for bottle 20 has just been removed by cap puller 236. In position "C," bottle 20 is inclined for pouring of its contents into cup 22 and, in position "D," bottle 20 is substantially horizontal ready for movement into an empty bottle storage compartment 207. As soon as frame 133 starts to move upwardly in guides 135 carrying cradle 195 therewith, roller 197 riding in cam groove 199 will tilt the cradle 195 and accordingly, the bottle 20 to a substantially 45 degree angle as shown by position "B" in Fig. 2. Such swinging movement of the cradle 195 moves a finger 209 on actuator 205 against an adjustable stop 211 on frame 133, causing the clamp 203 to move against the bottle 20 by snap-action of the actuator, thereby holding the bottle 20 on the cradle 195 as shown in position "B."

As frame 133 and cradle 195 with bottle 20 thereon continue to move upwardly, cap 234 will be engaged by swingable puller 236 and be removed from bottle 20. As bottle 20 is carried to position "C," it will be tipped for pouring of its contents into cup 22. As the emptied bottle 20 reaches the horizontal position "D," finger 209 will move against a stop 215 on back wall 139 releasing clamp 203, whereupon continued upward movement of the frame 133 and cradle 195 moves the empty bottle 20 into compartment 207 through the open bottom of the latter, past a pair of opposed spring-loaded dogs, one pair whereof only is illustrated in Fig. 2 of the drawings and designated by the numeral 217.

Such means for permitting upward movement of the bottles 20 yet restraining the same against downward movement, may be similar to that illustrated in the aforesaid Patent No. 2,438,050 and designated therein by the numeral 108. The empty bottles 20 are pushed upwardly in compartment 207 until the same reach a position where the uppermost bottle will move from compartment 207, over the upper end of partition 37 and be deposited in the empty brackets 59 shown in Fig. 1 of the drawings at the upper right-hand corner of conveyor 43. As the empty cradle 195 returns toward the lowermost end of its path of travel and reassumes the substantially 45 degree position "B," the finger 209 will again move against the adjustable stop 211, moving the clamp 203 toward the closed position and the unit remains in such condition in the stand-by position.

At the beginning of the next cycle of operation, the first movement of cradle 195 is downwardly as above indicated, whereupon a second finger 219 moves against an up-standing rod 221 opening clamp 203. Simultaneously, frame 133 moves against crank 187 to move another bottle 20 from hopper 181 to cradle 195.

Cups 22 are delivered automatically from a storage receptacle in compartment 39 by means of an automatic dispenser 223 operated by electric motor 148, the dispensed cup 22 falling on frame 213 and being directed to a shelf 225 within cabinet door 41.

Figure 7:
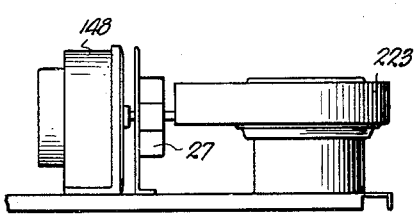
Fig. 7 is an elevational view of the cup dispenser and its drive motor similar to Fig. 2.
Figure 5:
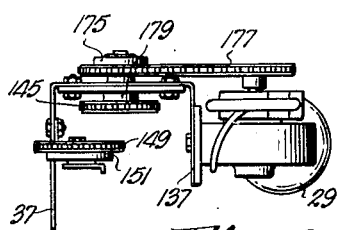
Fig. 5 is an enlarged, top plan view of the unit shown in Fig. 4.

Motor 148 also operates a plurality of cam-actuated switches designated broadly in Figs. 7 and 18 by the numeral 27. An access or vending door 24 forming a part of one of the main doors 41 and vertically reciprocable therein, is normally held against upward movement by means of a latch 220, pivotally secured to door 41 as at 225 and biased in the operative position by a spring 227. Latch 220 normally overlies a stop 229 on door 24 and is released through the medium of a solenoid 218 that in turn actuates an arm 231. When arm 231 is swung in one direction by solenoid 218 against the latch 220, it causes the latter to swing on the pivot 225 thereby releasing door 24 for free upward movement.

A normally closed switch 30 (see Figs. 2 and 18) is provided with a ruler 233 on its actuating arm that bears against the door 24 and is normally positioned within a cavity 235 in door 24. Thus, when door 24 is moved upwardly, forcing the roller 233 out of cavity 235, switch 30 is moved from the normally closed position shown in Fig. 18.

Another normally closed switch 26 (Figs. 1 and 18) within the path of travel of the cups 22 adjacent dispenser 223, opens automatically when the supply of cups 22 becomes exhausted.

A pair of control switches broadly designated by the numeral 71, are mounted for simultaneous actuation by a projection 237 on chain 145 (Fig. 4).

Actuating arm 239 for switch unit 71 is swingably mounted on plate 137 and includes a pair of opposed, lateral extensions 241 and 243 within the path of travel of the projection 237. When projection 237 moves downwardly, it strikes extension 243, moving the switches of unit 71 to the normal position illustrated by Fig. 18 and when projection 237 moves upwardly, it strikes extension 241 to move the switches of unit 71 to their other position.

In the event that cap 234 is not properly removed from bottle 20 by puller 236 and the contents of the bottle 20 not poured into cup 22, the metallic cap 234 will move against a switch 236 (Figs. 2 and 18) presenting an electrical bridge and closing certain circuits to cause a repeat cycle of operation as will hereinafter be made more clear in connection with the description of Fig. 18.

Referring now to Fig. 18, illustrating many electrical components not otherwise shown in the drawings, a transformer 19 has its primary 21 coupled with a suitable source of electrical energy (not shown) and is provided with secondaries 23, 25 and 31. With a bottle 20 in hopper 181, a cup 22 ready to be vended from dispenser 223 and the cup door 24 closed, cup switch 26, bottle switch 28 and cup door switch 30 are all in the normally closed position shown, and coils 32 and 34 of relays 36 and 38 respectively are deenergized.

Under such stand-by condition, coil 40 of relay 42 is energized through the following circuit:

From secondary 23, through lines 44, 46, 48, 50, 52 and 54, normally closed switches 26, 28 and 30, line 56, coil 40 of relay 42, line 58, normally closed switch 60 of relay 36, line 62, stationary contact 64 and switch 66 of relay 38, lines 68 and 70, normally closed switch 72 of unit 71 (Figs. 4 and 18) and lines 74, 76, 78 and 80 to secondary 23.

Such energization of coil 40 holds switch 82 of relay 42 away from contact 84 and against contact 86 to energize coil 88 of a coin reject relay in a slug rejector (not shown) so the unit will accept coins. The circuit for coil 88 is traced as follows:

From secondary 23, through lines 44, 46, 48, 50, 52, 90 and 92, coil 88, line 94, contact 84, switch 82, and lines 96, 98 and 80 to secondary 23.

The above conditions must all be met before the machine will accept a coin or coins, or other medium.

As soon as a coin is accepted by the slug rejector, such coin momentarily moves a switch arm 108 from contact 110 to contact 112, thereby energizing coil 34 of relay 38 as follows:

From secondary 23 through lines 44, 46, 48, 50, 114 and 116, coil 34, lines 118 and 120, contact 112, switch arm 108, and lines 122, 78 and 80 to secondary 23.

Energization of coil 34 actuates switches 66, 126 and 132 of relay 38, moving switch 66 from contact 64 to contact 124, switch 126 from contact 128 to contact 130, and switch 132 from contact 134 to contact 136.

Coil 34 remains energized even after return of switch arm 108 to contact 110 through the following holding circuit:

From secondary 23 through lines 44, 46, 48, 50, 114 and 116, coil 34, line 136, contact 124, switch 66, lines 68 and 70, normally closed switch 72 and lines 74, 76, 78 and 80 to secondary 23.

Simultaneously, such movement of switch 66 away from contact 64, deenergizes coil 40 of relay 42. Switch 82 moves to contact 84, deenergizing coil 88 whereby any coin thereafter inserted will be rejected. A "Do Not Deposit Coin" lamp 138 is energized as follows:

From secondary 23 through lines 44, 46, 48, 50, 52, 90 and 140, lamp 138, line 142, contact 84, switch 82, and lines 96, 98 and 80 to secondary 23.

With cam-operated switch 144 of unit 27 (see also Fig. 7) engaging contact 146, movement of switch 132 of relay 38 into engagement with contact 136, energizes cup dispenser motor 148 as follows:

From secondary 23, through lines 44, 46, 48 and 150, motor 148, line 152, switch 144, contact 146, line 154, contact 136, switch 132, and lines 156, 158, 76, 78 and 80 to secondary 23.

A cup 22 is immediately dropped by dispenser 223 to guide frame 213 and thence to platform 225 within door 41.

As above mentioned, all of the switches of unit 27 are cam-operated through cup dispenser motor 148 and their stand-by positions are as shown in Fig. 18.

During the initial operation of motor 148, switch 144 is moved from contact 146 to contact 160, and motor 148 thereupon receives current from the following circuit:

From secondary 23 through lines 44, 46, 48 and 150, motor 148, line 152, switch 144, contact 160, line 162, switch 164, contact 166, line 168, switch 170, contact 172, and lines 174, 176, 158, 76, 78 and 80 to secondary 23. (Note that all of these switches form a part of unit 27.)

This last mentioned circuit is deenergized by motor 148 operating the cam for switch 170, moving the latter to contact 178 immediately after dispensing of cup 22. Thus, at this stage of the cycle, motor 148 is deenergized, switch 144 of unit 27 is in engagement with contact 160, switch 170 of unit is in engagement with contact 178, and the remaining switches of unit 27 are still in the normal positions shown.

Exciter lamp 100 for photo-electric cell 102, which in turn provides a grid bias for tube 103 (all shown in Fig. 18 only), is energized as follows:

From secondary 23 through line 104, lamp 100 and lines 106, 98 and 80 to secondary 23.

A beam of light from lamp 100 to cell 102 is broken by a cup 22 resting on platform 225.

The heater circuit for tube 103 is through lines 180 and 182, coupled with secondary 31. Its anode-cathode circuit is traced as follows:

From secondary 23, through lines 18, 78 and 122, switch 108 (which returned to the normal position shown as soon as the deposited coin moved therebeyond) contact 110, wires 184 and 186, tube 103, wire 188, coil 32 of relay 36, and wires 190, 114, 50, 48, 46 and 44 to secondary 23.

However, a negative bias normally is maintained on tube 103, to hold the same against firing, by operation of photo-electric cell 102, in turn coupled with tube 103 by line 192, and with one side of secondary 25 by line 194. Thus, when cup 22 drops between exciter lamp 100 and cell 102, tube 103 will fire and energize coil 32 of relay 36.

As soon as switch 196 of relay 36 closes, drive motor solenoid 198 (see also Fig. 6) is energized through the following circuit:

From secondary 23, through lines 44, 46 and 200, solenoid 198, line 202, switch 204 of unit 71 (see also Fig. 4), contact 206, line 208, contact 130, switch 126 of relay 38 (still held closed), line 210, switch 196 of relay 36 (now closed) and lines 212, 214, 98 and 80 to secondary 23.

Solenoid 198 operates to close drive motor switch 216 (see also Fig. 6) to energize drive motor 29 through the following circuit:

From secondary 23 through lines 44 and 246, motor 29, switch 216 (now closed) and lines 248, 214, 98 and 80 to secondary 23.

Figure 3:
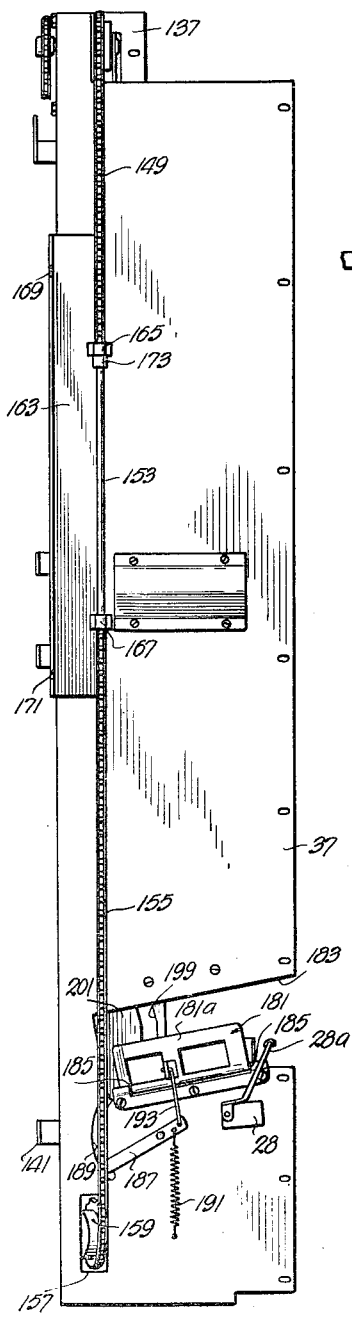
Fig. 3 is an elevational view of a vertical partition between the conveyor units and the drive mechanism forming a part of the cabinet illustrated in Figs. 1 and 2 and looking toward said drive unit.

The first movement of cradle 195 after energization of drive motor 29 is downwardly, opening clamp 203 by finger striking rod 221, swinging crank 187 to tilt hopper 181 to the position shown in Figs. 3 and 4, rolling bottle 20 from hopper 181 to cradle 20 and opening switch 28. Such opening of switch 28 has no effect on the circuits since coil 40 of relay 42 is already deenergized by switch 60 of relay 36 being open. Switch 28 is merely to prevent acceptance of a coin if there is no bottle 20 in hopper 181 during stand-by condition. Likewise, cup switch 26 opens only when there is no cup ready for delivery by dispenser 223 during stand-by to deenergize coil 40 and prevent coin acceptance.

Motor 29 then moves cradle 195 to pouring position C (Fig. 2), projection 237 (Fig. 4) engages extension 241, swinging arm 239 and actuating switch unit 71, whereupon its switch 204 moves to contact 224 to deenergize solenoid 198, opening switch 216 and stopping motor 29 so that the cradle 195 will not move while the contents of bottle 20 pour into cup 22. And, switch 72 of unit 71 opens to deenergize the holding circuit through switch 66 for relay 38.

Note that during this period of operation, prior to such deenergization of motor 29, relay 38 has been functioning to (1) maintain coil 40 deenergized so that coil 88 will not function, thereby preventing acceptance of a coin, as well as keeping lamp 138 lighted. With switch 72 now open, coil 40 will remain deenergized though switch 66 returns to contact 64. (2) Energize motor 29 through its switch 126. Switch 132, however, has since become inactive so far as motor 148 is concerned because of actuation of switch 144 and subsequent stopping of motor 148 by operation of switch 170.

Return of switch 126 to contact 128 through deenergization of coil 34 of relay 38 makes it possible for a customer to open door 24 and receive his cup 22 of liquid poured from bottle 20.

Vending door latch solenoid 218 for operating latch 220 to release vending door 24 is energized as follows:

From secondary 23 through lines 44, 46, 48, 50, 114, 116 and 246, solenoid 218, line 224, contact 128, switch 126, line 210, switch 196 (still closed), and lines 212, 214, 98 and 80 to secondary 23.

Opening of switch 30 by upward movement of door 24 has no effect upon the circuits, but until door 24 is again closed, open switch 30 will prevent receipt of a coin for subsequent operations.

With switch 170 still engaging contact 178, and switch 132 of relay 38 now again engaging contact 134, cup dispenser motor 148 is again energized as follows:

From secondary 23, through wires 44, 46, 48 and 150, motor 148, wire 152, switch 144, contact 160, wire 162, switch 164, contact 166, wire 163, switch 170, contact 178, line 216, contact 134, switch 132, and lines 156, 158, 76, 78 and 80 to secondary 23.

Motor 148 then actuates the cam for switch 170 to return the same to contact 172 (switch 144 still engaging contact 160 and switches 164 and 226 remaining as shown) and motor 148 is energized as follows:

From secondary 23 through lines 44, 46, 48 and 150, motor 148, line 152, switch 144, contact 160, line 162, switch 164, contact 166, line 166, switch 170, contact 172, line 174, and lines 176, 158, 76, 78 and 80 to secondary 23, precisely as before and hereinabove traced.

Motor 148 thereupon operates the cams for switches 164 and 226 to close the latter and to deenergize motor 148 respectively.

At this point, dispenser 233 has operated part of its cycle to position the next cup 22 ready for vending and the switches 170, 144 and 164 are in engagement with contacts 172, 160 and 230 respectively, and switch 226 is closed.

Thus, since switch 204 is now engaging contact 224, solenoid 198 is again energized to close switch 216 and drive motor 29 as follows:

From secondary 23, through lines 44, 46 and 200, solenoid 198, line 202, switch 204, contact 224, line 228, switch 226 and lines 178, 158, 76, 78 and 80 to secondary 23.

Motor 29 continues to operate, moving empty bottle 20 into compartment 207 and returning cradle 195 to a position near the lowermost end of its path of travel; and stops by virtue of projection 237 striking extension 243 of arm 239, actuating arm 239 and switch unit 71. Return of switch 204 to contact 226 breaks the circuit to motor 29 and closing of switch 72 again energizes motor 148 as follows:

From secondary 23, through lines 44, 46, 48 and 150, motor 148, line 152, switch 144, contact 160, line 162, switch 164, contact 230, lines 232 and 70, switch 72 and lines 74, 76, 78 and 80 to secondary 23.

Motor 148 continues until a cup 22 has been positioned for vending and first opens switch 226 and returning switch 164 to contact 166. The following circuit takes over for the third time to drive motor 148:

From secondary 23 through lines 44, 46, 48 and 150, motor 148, line 152, switch 144, contact 160, line 162, switch 164, contact 166, line 168, switch 170, contact 172, line 174, and lines 176, 158, 76, 78 and 80 to secondary 23, precisely as before and hereinabove traced.

Motor 148 stops as soon as the cam for switch 144 moves the latter to the contact 146.

The customer removes cup 22 allowing the light beam from lamp 100 to strike cell 102, placing a bias on tube 103. With no flow of plate current in tube 103, coil 32 of relay 36 will become deenergized. Opening of switch 196, deenergizes solenoid 218. And, after the cup has been removed, closed switch 72 will re-establish the circuit through relay 40, readying the machine for accepting a coin.

If metal cap 234 of bottle 20 is not removed by puller 236, cap 234 will bridge the switch 238, when the full bottle comes to rest in the compartment 207. The machine will come to rest after removal of the empty cup 22 (according to operating instructions for the customer) from platform 225 and the circuit will again appear as in Fig. 18 except that switch 238 will be bridged by cap 234.

Then instead of switch 108 energizing coil 34 of relay 38 it will be energized as follows:

From secondary 23, through lines 44, 46, 48, 50, 114 and 116, coil 34, lines 118, 240, switch 238, line 242, contact 86, switch 82, and lines 96, 98 and 80 to secondary 23.

The entire cycle will be repeated and during such operation the next empty bottle 20 will force the full bottle 20 upwardly in compartment 207 to break the bridge of switch 238.

As a summary of operation, coins are accepted only if (1) control switches 204 and 72 are in the positions shown in Fig. 18, (2) electric current is turned on, (3) bottle 20 is in hopper 181, (4) cup switch 26 is closed, and (5) vending door 24 is closed.

On deposit of coins, all will be rejected if the above conditions are not met. Otherwise, the coins are tested by the slug rejector and all slugs rejected. Operation of the coin mechanism actuates switch 108, and if so equipped, change is returned to the customer.

Relay 38 thereupon sets up a holding circuit, releasing relay 42, setting the coin mechanism to reject further coin insertion and lighting lamp 138.

Simultaneously, the cup dispenser motor 148 operates, a cup 22 is dropped to platform 225 and cup 22 breaks the light beam to photo-electric cell 102. Tube 103 fires, energizing relay 36 and solenoid 198 starts drive motor 29.

Cradle 145 moves down, clamp 203 opens, bottle 20 rolls from hopper 181 to cradle 145, cradle 145 carries bottle 20 upwardly, clamp 203 closes and cap 234 is removed. Bottle 20 is then tilted and its contents poured into cup 22.

Switches 204 and 72 are actuated and motor 29 stops while the bottle pours. The holding circuit to relay 38 is broken and the solenoid 218 is actuated so that door 24 is unlocked.

Cup dispenser 223 operates through part of its cycle, actuating switches 164 and 226, whereupon motor 148 stops and motor 29 starts, operating the lower conveyor 45 to drop a bottle 20 into hopper 181. When cradle 145 nears the upper end of its path of travel, clamp 203 is released, the empty bottle 20 is forced into compartment 207, and an empty bottle 20 at the top of compartment 207 is forced into upper conveyor 43.

As cradle 145 returns toward the lowermost ends of its path of travel, upper conveyor 43 operates, dropping a bottle 20 to lower conveyor 43. Switches 204 and 72 are returned to normal, drive motor 29 stops and cup dispenser motor 148 completes its cycle.

When cup 22 is removed from platform 225, cell 102 breaks the circuit to relay 36, door 24 is closed and locks. If the above conditions are met at this time, relay 42 is energized, lamp 138 is turned off, and the unit is ready to accept coins.

If cap 234 has not been removed, the machine will re-cycle through cap switch 238.

Having thus described the invention what is claimed as new and desired to be secured by Letters Patent is:

1. In a vending machine, an upper and a lower shiftable assembly, each adapted to contain a plurality of articles; mechanism for receiving an article from the lower assembly and moving the same away therefrom; and structure operably connecting said mechanism with said assemblies, said structure having parts for shifting the lower assembly as said mechanism is moved in one direction, to advance an article from the lower assembly to said mechanism, and parts for shifting the upper assembly as said mechanism is moved in another direction, to advance an article from the upper assembly to the lower assembly.

2. In a vending machine, an upper and a lower shiftable assembly, each adapted to contain a plurality of articles; article transfer apparatus; mechanism for receiving an article from said apparatus and moving the same away therefrom; and structure operably connecting said mechanism with said assemblies, said structure having parts for shifting the lower assembly as said mechanism is moved in one direction, to advance an article from the lower assembly to said apparatus, parts for shifting the upper assembly as said mechanism is moved in another direction, to advance an article from the upper assembly to the lower assembly, and parts for actuating said apparatus for transferring an article therefrom to said mechanism as the latter continues to move in said last mentioned direction.

3. In a vending machine, an upper and a lower shiftable conveyor, each adapted to contain a plurality of bottles; a hopper for receiving a bottle from the lower conveyor and moving the same away therefrom; vertically reciprocable mechanism for receiving said bottle from the hopper and elevating the same; structure operably connecting said mechanism with the conveyors, said structure including parts for advancing the lower conveyor to transfer a bottle therefrom to said hopper as the structure rises and parts for advancing the upper conveyor to transfer a bottle therefrom to the lower conveyor as the structure moves downwardly; and means coupling said structure with the hopper to actuate the latter and move a bottle from the hopper to the structure as the latter moves downwardly.

4. In a vending machine, an upper and a lower shiftable conveyor, each adapted to contain a plurality of capped bottles; a hopper for receiving a bottle from the lower conveyor and moving the same away therefrom; vertically reciprocable mechanism for receiving said bottle from the hopper and elevating the same; means within the path of the bottle carried by said structure for removing the cap therefrom as the same is elevated; structure operably connecting said mechanism with the conveyors, said structure including parts for advancing the lower conveyor to transfer a bottle therefrom to said hopper as the structure rises and parts for advancing the upper conveyor to transfer a bottle therefrom to the lower conveyor as the structure moves downwardly; and means coupling said structure with the hopper to actuate the latter and move a bottle from the hopper to the structure as the latter moves downwardly.

5. In a vending machine, an upper and a lower shiftable conveyor, each adapted to contain a plurality of capped bottles; a tiltable hopper adapted to receive capped bottles from the lower conveyor as the same are fed singly therefrom; a vertically reciprocable bottle carrier adapted to tilt the hopper to transfer a capped bottle therefrom to the carrier as the latter moves downwardly from a stand-by position; means within the path of the capped bottle in the carrier for removing the cap therefrom as the carrier moves upwardly from the hopper; means for tipping the uncapped bottle in the carrier to pour the contents therefrom; structure connecting the carrier with the lower conveyor for advancing a capped bottle therefrom to the hopper as the carrier elevates the empty bottle carried thereby; means for guiding said empty bottle from the carrier to the upper conveyor; and means connecting the carrier with the upper conveyor for advancing a capped bottle therefrom to the lower conveyor as the carrier moves downwardly from said guide means toward said stand-by position.

6. In a vending machine as set forth by claim 5 wherein is provided means for dispensing a cup to a position for receiving said poured contents, and means including the dispensed cup for controlling the reciprocation of said carrier.

7. In a vending machine as set forth by claim 5 wherein is provided means including a capped bottle in said hopper for controlling the downward movement of said carrier from said stand-by position.

RALPH H. MENNING.
ROBERT T. MANLEY.
JAMES R. PRATT.

References Cited in the file of this patent
UNITED STATES PATENTS

| Number | Name | Date |
|---|---|---|
| 1,238,225 | Walker | Aug. 28, 1917 |
| 1,322,813 | Parker | Nov. 25, 1919 |
| 1,408,430 | Anderson | Mar. 7, 1922 |
| 2,333,118 | Olson | Nov. 2, 1943 |